Nov. 29, 1932.  G. H. PFEFFERLE  1,889,133
MEANS FOR LOCKING PLAIN END PIPE SECTIONS
WITH RESPECT TO THE COUPLINGS THEREFOR
Filed July 8, 1930  2 Sheets-Sheet 1

INVENTOR
George H. Pfefferle
BY
Louis Prevost Whitaker
ATTORNEY

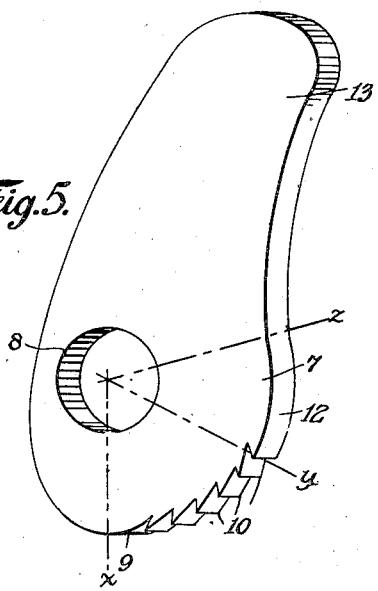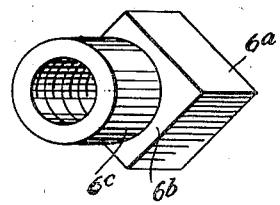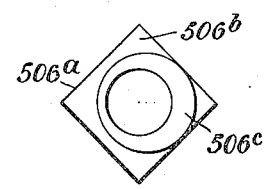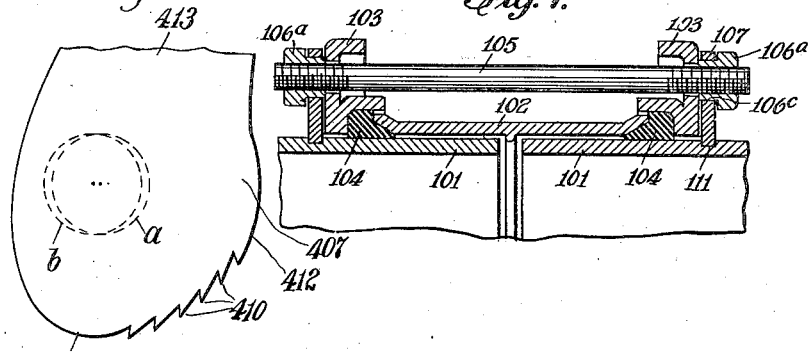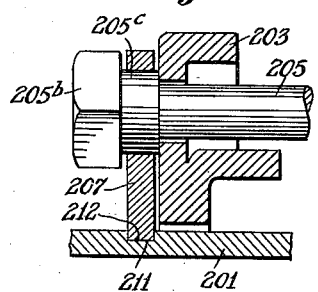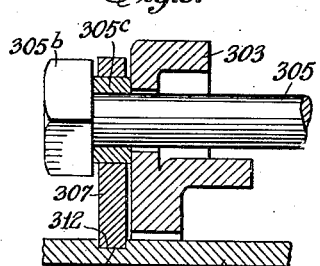

Patented Nov. 29, 1932

1,889,133

UNITED STATES PATENT OFFICE

GEORGE H. PFEFFERLE, OF BRADFORD, PENNSYLVANIA, ASSIGNOR TO S. R. DRESSER MANUFACTURING COMPANY, OF BRADFORD, PENNSYLVANIA, A CORPORATION OF PENNSYLVANIA

MEANS FOR LOCKING PLAIN END PIPE SECTIONS WITH RESPECT TO THE COUPLINGS THEREFOR

Application filed July 8, 1930. Serial No. 466,454.

My invention consists in the novel features hereinafter described, reference being had to the accompanying drawings which represent several embodiments of the same selected by me for purposes of illustration, and the said invention is fully disclosed in the following description and claims.

In laying pipe lines composed of pipe sections having one or both ends plain or unthreaded, and especially in connection with pipe lines in which the pipe sections are connected by couplings of the well known "Dresser" type, in which pipe sections are permitted longitudinal movement within the coupling to accommodate for expansion and contraction, it is frequently necessary or desirable to lock the pipe sections with respect to the couplings, so as to limit the longitudinal movement of the pipes with respect thereto.

My present invention relates to means for effecting such locking of the pipe sections, which can be applied to any ordinary coupling of the kind described at one or a plurality of points around the periphery of the pipe, and which can be applied at any point in the line in laying the line or at any point in the line already laid, without any modification or special construction of either pipe section or coupling.

In carrying out my invention, I employ a locking plate having a pivotal aperture for connecting it with a member of the coupling in such manner as to hold it substantially perpendicular to the axis of the adjacent pipe, the said locking plate being provided with a series of cutting teeth capable of cutting a locking notch in the adjacent portion of the pipe section when the locking plate is rotated about its pivotal axis. The plate is preferably formed of hardened steel and provided with an arm or lever portion for rotating it usually by striking it with a hammer, and the plate is preferably provided with a curved edge having a portion eccentric to the pivotal axis of the plate, which is provided with the cutting teeth and having an adjacent portion, which need not be provided with cutting teeth, adapted to enter the notch and pipe after it is formed. The arm or lever portion of the plate is conveniently located in such relation to the curved cutting and locking edge that it will be brought into contact with other portions of the outer surface of the pipe when the said curved edge is in locking engagement with the notch in the pipe, thus forming a stop for the rotary movement of the pipe about its pivotal axis.

In the preferred form of my invention, I employ in connection with the locking plate a clamping nut to take the place of the ordinary clamping nut for engaging a clamping bolt of the coupling, the said nut being provided with a bearing sleeve portion of reduced diameter on the face adjacent to the clamping ring of the coupling, to engage the pivotal aperture in the locking plate and secure it to the coupling. The bearing sleeve is preferably of greater length than the thickness of the locking plate, so that after the locking plate is in locking engagement with the pipe, a certain amount of endwise movement of the pipe with respect to the coupling is still permitted to accommodate normal expansion and contraction, while the pipe is firmly locked against any movement with respect to the coupling, beyond that permitted by the length of the pivotal sleeve.

My invention also comprises the novel features of construction and combination of parts herein fully described and particularly pointed out in the claims.

In the accompanying drawings which illustrate several embodiments of my invention, Fig. 1 represents a cross-section through a pipe section at one end of a coupling, showing the coupling provided with a plurality of my improved locking devices.

Fig. 5 is a detail perspective view of the locking plate.

Fig. 6 is a detail perspective view of the form of nut which I prefer to use in connection therewith.

Fig. 7 is a partial sectional view of the coupling and adjacent pipe ends showing one of the clamping bolts threaded at opposite ends, and having each end of the bolt provided with a locking plate.

Fig. 8 is a detail view showing a modification of my invention, in which the locking plate is pivoted on a bearing portion formed on the inner face of the bolt head.

Fig. 9 is a similar view showing the bolt provided with a separate ring or collar forming the bearing for the locking plate.

Fig. 10 is a detail view of one of the locking plates before forming the pivotal aperture therein.

Fig. 11 is a detail view of a modified form of nut having an eccentric bearing portion.

Figure 1:
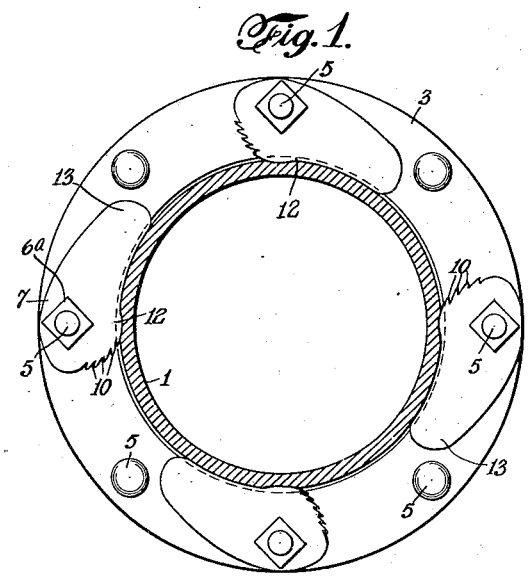
Figure 2:
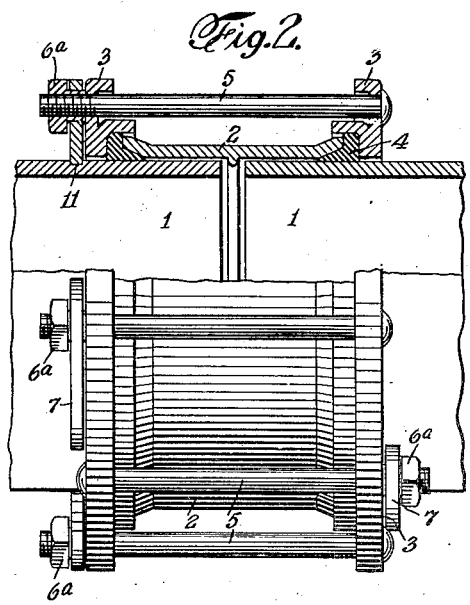
Fig. 2 is a longitudinal sectional view partly in section, showing two plain end pipe sections connected by a coupling having the clamping rings at each end thereof provided with my improved locking devices.
Figure 3:
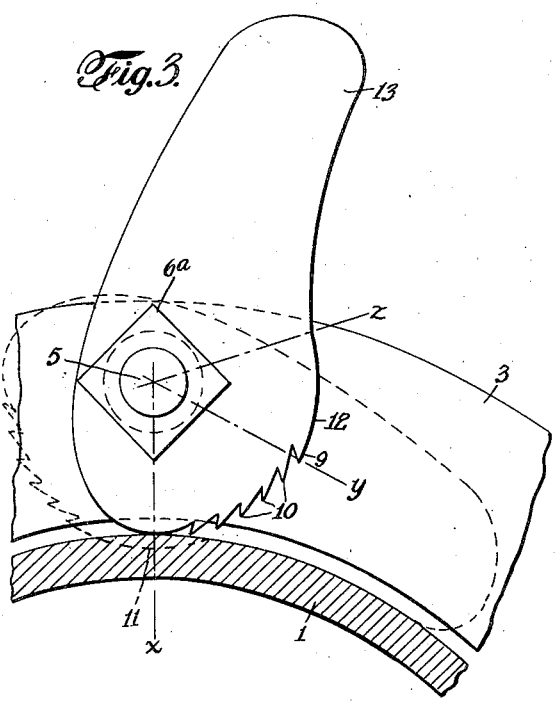
Fig. 3 is an enlarged detail view partly in section of a portion of a clamping ring and the adjacent pipe section, and showing the locking plate before it is forced into locking position, and indicating in dotted lines the locking position of the plate.
Figure 4:
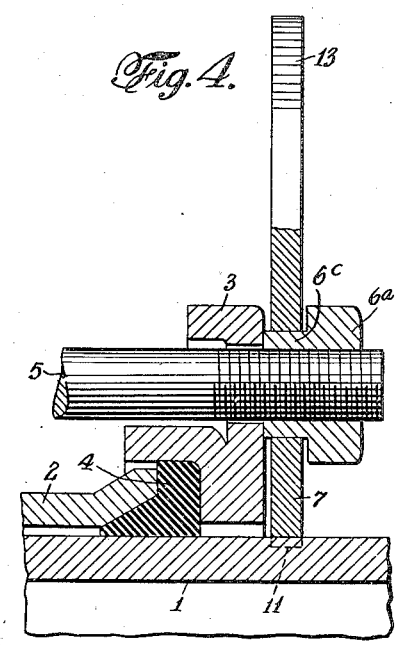
Fig. 4 is a transverse sectional view of the parts shown in Fig. 3.

Referring to Figs. 1 to 6 inclusive, I have illustrated in Fig. 2 a pipe coupling of the well known "Dresser" type for connecting the plain ends of adjacent pipe sections, and the application of my present invention thereto. 1, 1, represent the pipe ends connected in the usual manner by the coupling which comprises the metal ring, 2, clamping rings, 3, 3, packing rings, 4, 4, and clamping bolts, 5, extending through bolt apertures in the clamping rings, and provided with clamping nuts, 6 and 6ª. The clamping nuts, 6, are the ordinary nuts employed with the clamping bolts, and where the locking plates are to be employed, I employ a slightly different form of nut shown in detail in Fig. 6, in which the main body of the nut is indicated at 6ª, and is provided on its inner face, 6ᵇ, with an annular bearing portion or sleeve, 6ᶜ, the inner face of which comes in contact with the adjacent clamping ring, 3. 7 represents the locking plate, which is provided with a central pivotal aperture, 8, adapted to fit over the sleeve, 6ᶜ, of the nut, 6ª. This locking plate is preferably formed of hardened steel substantially as illustrated in Figs. 3 and 5, and is provided with a curved cutting and locking edge indicated at 9. A portion of this curved edge between the dotted lines, x and y of Figs. 3 and 5, is eccentric to the pivotal axis of the plate, or in other words eccentric to the center of the pivotal axis, 8, and is provided with a plurality of cutting teeth, 10, which will therefore be located at increasing distances from said axis for the purpose of engaging the outer surface of the adjacent pipe section, 1, and cutting a locking notch, 11, therein, as the plate is rotated about its pivotal axis. I prefer to provide the curved edge, 9, with a portion, 12, as indicated between the dotted lines, y and z, (Figs. 3 and 5), which is substantially concentric or co-axial to the pivotal axis of the plate, for the purpose of entering the notch, 11, and forming a firm locking connection therewith after the formation of the locking notch. The locking plate, 7, is also provided with a lever arm, 13, extending on the opposite side of the pivotal axis of the plate from the curved cutting and locking edge, 9, for the purpose of enabling the plate, 7, to be turned about its pivotal axis by tapping it with a hammer or other tool, to cut the locking recess, 11, in the pipe section and seat the locking portion, 12, firmly therein. I also prefer to so locate the lever arm, 13, with respect to the curved cutting and locking edge, 9, that when the locking plate is in locking engagement with the notch, 11, in the pipe, the outer end of the arm, 13, will be in engagement with the outer surface of the pipe section, 1, so as to be out of the way and also to limit the rotary movement of the plate, as indicated in Fig. 1 and in dotted lines in Fig. 3.

It will be seen that these locking plates can be secured in position at as many points around the coupling as may be deemed necessary or desirable. For example in Fig. 1, in which the clamping rings of the coupling are shown as provided with eight clamping bolts, I have shown four of the locking plates, 7, in operative position, thus locking the pipe at four separated points to the coupling, but obviously any desired number of the locking plates can be used, and by reversing some of the bolts carrying the special nut, 6ª, the opposite end of the coupling can, in a similar manner, be provided with locking plates engaging the other pipe section, as indicated in Fig. 2. It will be seen that it is only necessary to apply the special nuts, 6ª, and the locking plates, to the projecting ends of the clamping bolts, 5, and tightening the coupling in the usual manner, leaving the lever arms, 13, of the locking plates projecting outwardly from the nuts. The lever arms of the locking plates are then tapped with a hammer, so as to bring the cutting teeth, 10, into contact with the outer face of the pipe section, and to cause them to cut the locking notch, 11, therein. Of course this in itself would effect a locking of the pipe section with respect to the coupling, but I prefer to provide the co-axial portion, 12, on each locking plate, and to so construct the lever, 13, that the locking plate can be rotated further so as to bring the substantially concentric or co-axial portion, 12, into locking engagement with the notch, 11, formed by the teeth, 10, as this gives a more thorough and complete locking action.

The bearing sleeve portion, 6ᶜ, of the nut, which forms the pivot for the locking plate, is preferably made longer than the thickness of the locking plate, as clearly shown in the drawings and terminates at its outer end in a retaining shoulder, in this instance formed by the head of the nut. This permits the pipe section to have a certain amount of longitudinal movement with respect to the coupling sufficient to accommodate normal contraction and expansion due to changes in temperature, but the locking plates will positively limit this movement and lock the pipes with respect to the coupling.

It will be seen that the pipe sections can be securely locked with respect to the coupling notwithstanding any angular position which they may occupy with respect to the coupling, as the locking notches, 11, are formed in the pipe sections in situ. It will also be seen that my improved locking plates can be attached to a coupling in a pipe line or laid, wherever this may be desirable, without disturbing the line, by simply removing one of the ordinary nuts at a time, and replacing it with the special nut, 6ª, and locking plate, and tightening the nut, after which the locking plate is driven home in the manner previously described.

Where the coupling is of comparatively small diameter and is provided with a comparatively small number of bolts, so that a sufficient number of locking plates cannot be conveniently applied by reversing certain of the bolts, the bolts or certain of them may be provided with threaded portions at both ends to receive the special nuts and locking plates at both ends of the bolts. Thus in Fig. 7, in which the parts corresponding to those previously described are given the same reference numerals with the addition of 100, I have shown a coupling bolt, 105, having a threaded portion, 105ª, at each end provided with the special nut, 106ª, and locking plate, 107, constructed and operating as previously described.

I wish it to be understood that while it will ordinarily be found most convenient and desirable to secure the locking plates in pivotal connection with the coupling by the use of the special nuts, 6ª, (106ª) as previously described, I do not limit myself to this method of pivotally connecting the locking plate to the clamping ring or other part of the coupling through which or into which the plain pipe end extends, and they may be pivotally secured thereto in any other desired manner.

In Fig. 8, in which the parts corresponding with those previously described are given the same reference numerals with the addition of 200, I have shown a bolt, 205, having its head, 205ᵇ, provided with a reduced bearing portion, 205ᶜ, to receive and pivotally support the locking plate, 207, and where such a bolt is employed, the threaded end may be provided with an ordinary nut or with the special nut previously described and illustrated in Fig. 6, depending upon whether it is desired to employ a locking plate at each end of the bolt or at one end only.

In Fig. 9, in which the parts corresponding with those previously described are given the same reference numerals with the addition of 300, I have shown another slight modification of my invention in which the bolt, 305, is provided adjacent to its head, 305ᵇ, with a separate bearing sleeve or collar, 305ᶜ, to receive and pivotally support a locking plate, 307, which operates in the manner previously described.

It will be seen that my improved locking means involves no change whatever in the design of the coupling and no previous preparation of the pipe sections. The locking notches or recess, 11, formed in situ, as previously described, do not weaken the pipe as would be the case if a locking groove extending entirely around the pipe were employed, and the formation of these locking notches in situ obviates the expense which would be necessary in providing the pipe ends with such a groove. Moreover, the provision of a groove in the pipe ends could not possibly provide for the locking of the pipe in different angular relations with the coupling, in anything like the accurate and desirable manner in which they can be locked with my invention where the locking notches are formed in situ, and therefore accommodate any angular position of the pipe. By the use of my invention, it is unnecessary to tighten up each coupling to the maximum extent as the pipe sections are laid. The pipe sections may be connected and partially tightened, and the final tightening and locking of the couplings may be followed afterwards, as may be most convenient. The full effects of the flexibility of this type of coupling are therefore retained, and the pipe sections may be locked with respect to the coupling wherever necessary, either at the time of laying the pipes or at any time thereafter, as may be found most desirable.

I have also found that in couplings for a number of sizes of pipe using the same thickness of gasket the distance from the center of the bolt apertures to the exterior of the pipe varies comparatively little. In order to avoid the necessity of making and carrying in stock a quantity of locking plates for such varying sizes of coupling (as for example couplings for pipes ranging from ten inches inside diameter, to twenty inches outside diameter) could be provided with identical locking plates, if the axis of rotation of the locking plate could be very slightly changed with respect to the flanges with which they are used.

This may be accomplished in several ways. For example, the locking plates may be made up in quantity for a range of pipe sizes without punching or otherwise forming the pivot aperture therein, as shown in Fig. 10, for example, in which the parts corresponding with those in Figs. 1 to 6 are given the same numerals with the addition of 400. When locking plates are required for a certain size within said range, the required number of locking plates will be punched with the pivotal aperture located as indicated by the dotted circle, a, the axis of which aperture will be located at the required distance from the serrated portion, 410, and locking portion, 12, to produce the desired result. If the plates are to be used for a coupling for a larger size of pipe, the required number of plates may have the pivotal apertures punched, as indicated by the dotted circle, b, the axis of which is at the proper point for that size and so on. The ranges of sizes which can be used in this way with the same locking plates can be readily ascertained, and by making and keeping in stock a comparatively small number of different sized locking plates, the entire line including a far greater number of sizes can be thus economically provided with locking plates when desired.

I can also obtain this result within certain ranges by adjusting the pivotal axis of the locking plates when applied to the bolts, with respect to the axes of the bolts which support them. For example, in Fig. 11, in which the parts corresponding with those in Figs. 1 to 6 are given the same reference numerals with the addition of 500, I have shown the nut, 506a, provided with a bearing portion, 506c, the outer surface of which is eccentric to the axis of the bolt hole, and so formed that when placed in engagement with the pivotal aperture, a locking plate suitable for a certain range of pipe sizes, and made as shown in Fig. 5, and tightened, the eccentric portion will bring the serrated portion and locking portion of the plate into proper relation with the surface of the pipe.

What I claim and desire to secure by Letters Patent is:—

1. Locking means for securing a plain end pipe section in respect to a pipe coupling therefor, comprising a locking plate having a pivotal aperture for pivotally connecting it with the coupling and provided with a series of cutting teeth for forming a locking notch in the adjacent portion of a pipe section, said plate being provided with means for enabling it to be rotated upon its pivotal axis.

2. Locking means for securing a plain end pipe section in respect to a pipe coupling therefor, comprising a locking plate having a pivotal aperture for pivotally connecting it with the coupling and provided with a curved edge eccentric to the axis of said pivotal aperture, and having a plurality of cutting teeth in said edge, spaced at different distances from said axis for forming a locking notch in the adjacent portion of a pipe section to receive said plate, said plate being provided with an arm by which it can be rotated on its pivotal axis.

3. Locking means for securing a plain end pipe section in respect to a pipe coupling therefor, comprising a locking plate having a pivotal aperture for pivotally connecting it with the coupling and provided with a curved edge, a portion of which is eccentric to the axis of said pivotal aperture, and an adjacent locking portion of which is substantially coaxial with said axis, the said eccentric portion of said edge being provided with cutting teeth for forming a locking notch in the adjacent portion of a pipe section to receive the said coaxial portion of the plate, by a movement of said plate about its pivotal axis, said plate being provided with an arm for enabling it to be rotated on its pivotal axis.

4. Locking means for securing a plain end pipe section in respect to a pipe coupling therefor, comprising a locking plate having a pivotal aperture for pivotally connecting it with the coupling and provided with a curved edge, a portion of which is eccentric to the axis of said pivotal aperture, and an adjacent portion of which is substantially coaxial with said axis, the said eccentric portion of said edge being provided with cutting teeth for forming a locking notch in the adjacent portion of a pipe section to receive the said coaxial portion of the plate, by a movement of said plate about its pivotal axis, said plate being provided with an arm for enabling it to be rotated on its pivotal axis, the said arm being so located with respect to said coaxial edge portion as to engage other portions of the pipe member when said coaxial edge portion is in engagement with said locking recess.

5. In combination with a plain end pipe section and a coupling therefor, including a cylindrical member surrounding the plain end of the pipe section and provided with a packing engaging portion, an annular packing, a clamping ring for compressing said annular packing between it and said cylindrical member, and upon the outer surface of the pipe section to make a tight joint while permitting endwise movement of the pipe section with respect to the coupling, and clamping bolts engaging said clamping ring, of a locking plate disposed perpendicularly to the axis of the pipe and located on the outer face of the clamping ring, and provided with a pivotal aperture, a bearing portion of greater length than the thickness of the locking plate for engaging said aperture, secured to one of said bolts adjacent to the outer face of said clamping ring, and terminating at its outer end in a shoulder for pivotally supporting said locking plate and permitting a limited movement thereof in a direction laterally toward and from the clamping ring, said locking plate having a locking portion for engaging the pipe section, and an actuating portion for moving the locking plate upon said bearing portion to bring the said locking portion into and out of engagement with the pipe, whereby said plate when in locking position is capable of limited movement with the pipe with respect to the coupling while preventing the withdrawal of the pipe from the coupling.

6. In combination with a plain end pipe section, and a coupling therefor, including a cylindrical member surrounding the plain end of the pipe section and provided with a packing engaging portion, an annular packing, a clamping ring for compressing said annular packing between it and said cylindrical member, and upon the outer surface of the pipe section to make a tight joint while permitting endwise movement of the pipe section with respect to the coupling, and clamping bolts engaging said clamping ring, of a locking plate disposed perpendicularly to the axis of the pipe and located on the outer face of the clamping ring, and provided with a pivotal aperture, one of said bolts being provided on the outer face of said ring with a part rotatable with respect to the bolt and provided with a bearing portion eccentric to the bolt and of greater length than the thickness of the locking plate, terminating at its outer end in a shoulder for pivotally supporting said locking plate and permitting a limited movement thereof in a direction laterally toward and from the clamping ring, said locking plate having a locking portion for engaging the pipe section, and an actuating portion for moving the locking plate upon said bearing portion to bring the said locking portion into and out of engagement with the pipe, whereby said plate when in locking position is capable of limited movement with the pipe with respect to the coupling while preventing the withdrawal of the pipe from the coupling.

7. In combination with a plain end pipe section and a coupling therefor, including a clamping ring and clamping bolts, of a clamping nut for engaging one of said bolts, and provided with a bearing portion of smaller diameter on the face adjacent to the clamping ring, a locking plate having a pivotal aperture for engaging the bearing portion of the nut, and provided with a curved edge having cutting teeth for forming a locking notch in the adjacent face of the pipe section, said plate being provided with means for turning it to cut the said notch.

8. In combination with a plain end pipe section and a coupling therefor, including a clamping ring and clamping bolts, of a clamping nut for engaging one of said bolts, and provided with a bearing portion of smaller diameter on the face adjacent to the clamping ring, a locking plate having a pivotal aperture for engaging the bearing portion of the nut, and provided with a curved edge, portions of which are eccentric to the bearing portion and provided with cutting teeth, and a succeeding portion of said edge being substantially coaxial with said bearing portion, said plate having an arm extending on the opposite side of the bearing aperture from said curved edge, to enable the plate to be rotated on its pivotal axis, and adapted to engage the surface of the pipe section when said edge is in locking engagement with the pipe.

9. In combination with a plain end pipe section, and a coupling therefor, including a cylindrical member surrounding the plain end of the pipe section and provided with a packing engaging portion, an annular packing, a clamping ring for compressing said annular packing between it and said cylindrical member, and upon the outer surface of the pipe section to make a tight joint while permitting endwise movement of the pipe section with respect to the coupling, and clamping bolts engaging said clamping ring, of a locking plate disposed perpendicularly to the axis of the pipe end located on the outer face of the clamping ring, means for pivotally connecting said locking plate to the clamping ring constructed to permit a limited movement of the plate laterally toward and from the clamping ring, said locking plate having a locking portion adapted to be moved into and out of locking engagement with the pipe section, said plate being provided with an actuating portion for effecting its rotation upon its pivotal connection into and out of locking position, whereby said plate when in locking position is capable of limited movement with the pipe with respect to the coupling, while preventing the withdrawal of the pipe from the coupling.

10. In combination with a plain end pipe section and a coupling therefor, including a clamping ring, of a locking plate, means for pivotally connecting said plate to the said clamping ring, said means permitting relative movement between said plate and ring in the direction of the axis of the pipe, said plate having a curved edge, provided with cutting teeth for forming a notch in the adjacent portion of the pipe section, and an arm extending outwardly with respect to said pivotal connecting means for enabling said plate to be rotated into locking engagement with the pipe section.

11. In combination with a plain end pipe section and a coupling therefor, including a clamping ring and clamping bolts, of a clamping nut for engaging one of said bolts, and provided with a bearing portion of smaller diameter on the face adjacent to the clamping ring, a locking plate having a pivotal aperture for engaging the bearing portion of the nut, and provided with a curved edge, the bearing portion of said nut being longer than the thickness of said plate, to accommodate longitudinal movement of the pipe section with respect to the coupling, the curved edge of said plate being provided with cutting teeth for forming a locking recess in said pipe section, and having portions for lockingly engaging the said recess, said plate being provided with an operating arm for turning the plate on its pivotal axis, said arm being so located with respect to the locking portion of said plate as to engage the exterior of the pipe section when said edge is in locking engagement with said notch.

12. In combination with a plain end pipe section and a coupling therefor, including a clamping ring and clamping bolts and nuts, of a locking plate for said clamping ring pivotally secured thereto perpendicular to the axis thereof and provided with a cutting and locking edge for cutting a groove in the exterior of the pipe and lockingly engaging the same, and means for adjusting the pivotal axis of said plate toward and from the pipe.

13 In combination with a plain end pipe section and a coupling therefor, including a clamping ring and clamping bolts, of a nut for engaging one of said bolts provided with an eccentric bearing portion, a locking plate pivotally engaging said eccentric bearing portion of the nut and provided with a cutting and locking edge for engaging the exterior surface of the pipe, to form a locking recess therein and lockingly engage the same.

In testimony whereof I affix my signature.

GEORGE H. PFEFFERLE.